April 14, 1925.  
T. H. THOMAS  
1,533,481  
FLUID PRESSURE BRAKE DEVICE  
Filed April 9, 1923  2 Sheets-Sheet 2

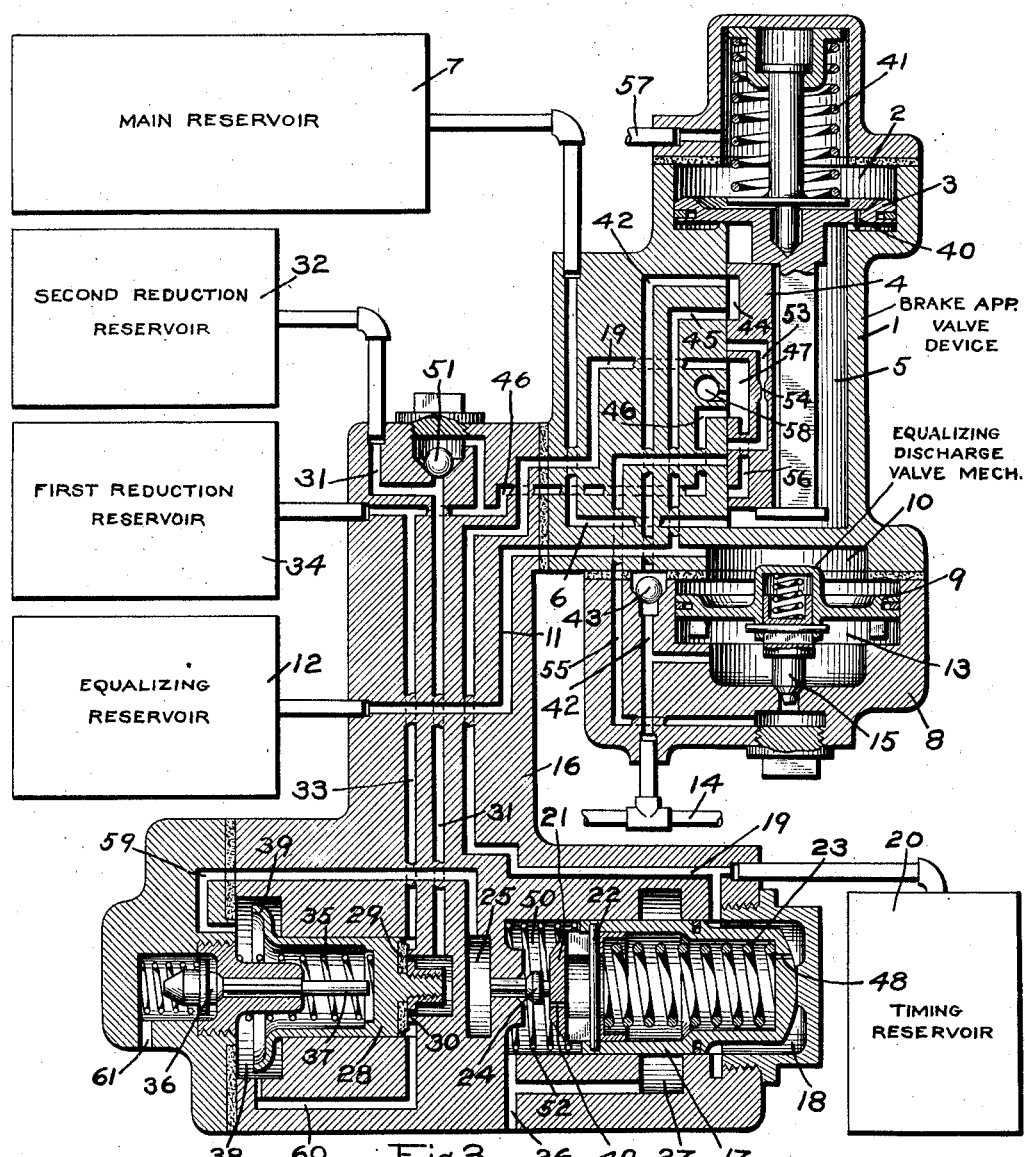
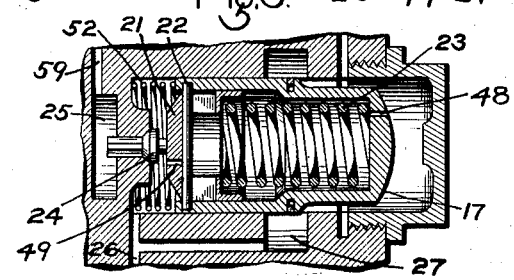

INVENTOR  
THOMAS H. THOMAS  
BY Wm. M. Cady  
ATTORNEY

Patented Apr. 14, 1925.                    REISSUED      1,533,481

UNITED STATES PATENT OFFICE.

THOMAS H. THOMAS, OF EDGEWOOD, PENNSYLVANIA, ASSIGNOR TO THE WESTING-HOUSE AIR BRAKE COMPANY, OF WILMERDING, PENNSYLVANIA, A CORPORATION OF PENNSYLVANIA.

FLUID-PRESSURE-BRAKE DEVICE.

Application filed April 9, 1923. Serial No. 630,686.

*To all whom it may concern:*

Be it known that I, THOMAS H. THOMAS, a citizen of the United States, residing at Edgewood, in the county of Allegheny and State of Pennsylvania, have invented new and useful Improvements in Fluid-Pressure-Brake Devices, of which the following is a specification.

This invention relates to a fluid pressure brake application controlling device, and more particularly as applied to an automatic train speed control equipment.

It is a well known fact that long trains can be handled more smoothly by means of a graduated rather than a continuous application of the brakes, since there is danger when a heavy continuous brake pipe reduction is made that the brakes will be applied at the head end of the train sufficiently in advance of those at the rear end as to cause the slack of the train to run in harshly and thus produce dangerous shocks and possibly a break-in-two on the recoil. The recommended practice for manipulating the brakes on a long train in order to overcome this difficulty, consists in first making an initial light brake pipe reduction, such as to insure that all the brakes on the train will apply, and then after moving the brake valve handle to lap position and holding the same there until the brake pipe exhaust ceases, to effect a heavier brake pipe reduction sufficient to produce the desired application of the brakes.

The principal object of my invention is to provide means for accomplishing automatically what is accomplished by the engineer manipulating the brake valve as above stated.

Figure 2:
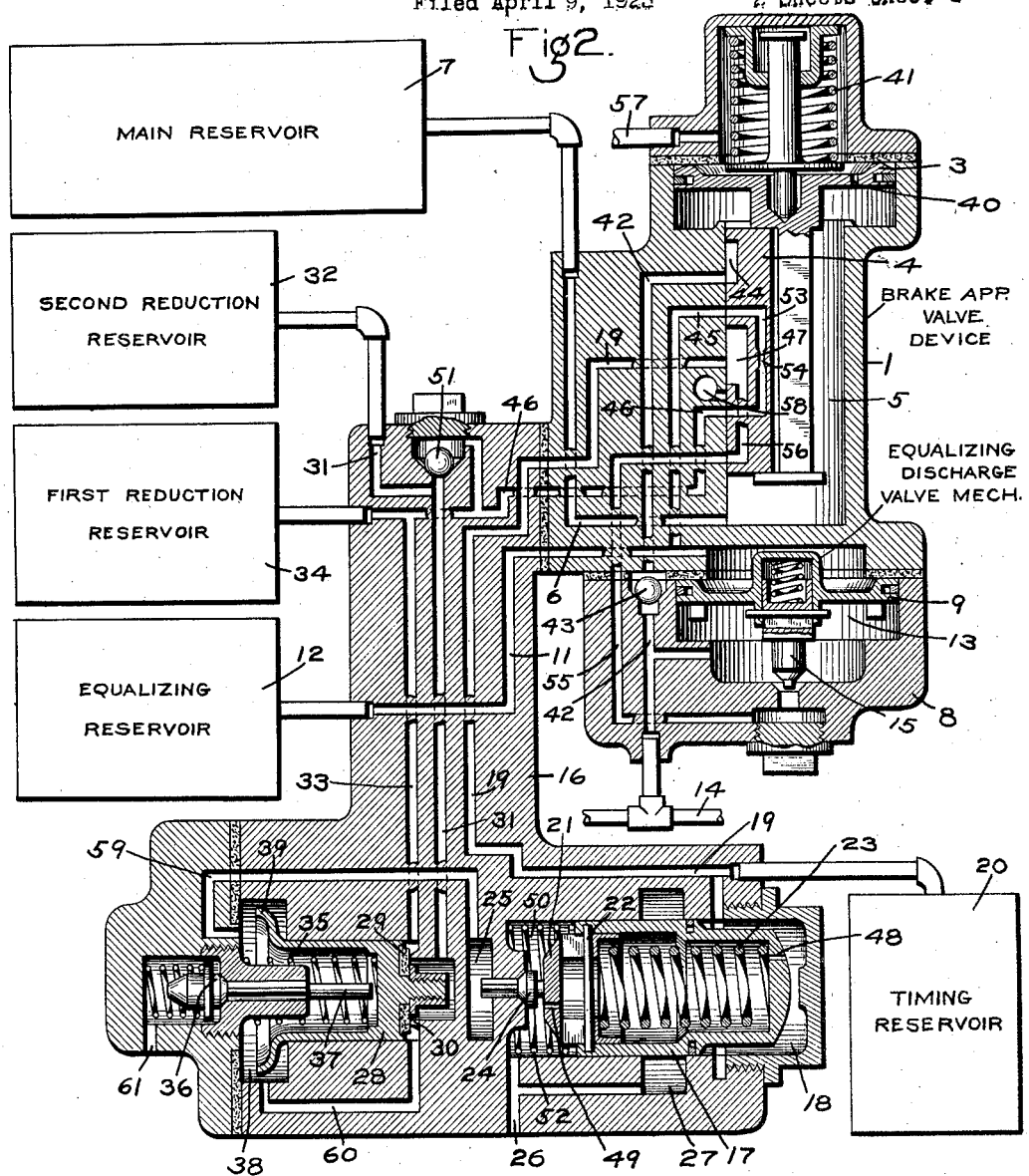

In the accompanying drawings; Fig. 1 is a diagrammatic view, in section, of a brake application controlling device embodying my invention and showing the parts in normal release position; Fig. 2 a similar view, showing the parts in brake application position, as initially assumed; Fig. 3 a sectional view of the pilot valve mechanism shown in Figs. 1 and 2 and in a position assumed after a period of time; and Fig. 4 a sectional view of the pilot and hold back valve mechanism of Figs. 1 and 2, showing the parts in position to effect the second reduction in brake pipe pressure.

A desirable application of my invention is in connection with an automatic train speed control equipment where the application of the brakes is automatically effected through the operation of the automatic speed control equipment, independently of the engineer, and in the drawings I have shown my invention as applied to an automatic speed control equipment.

As shown in the drawings, the equipment may comprise a brake application valve device, the operation of which is controlled by an automatic speed control apparatus (not shown). Said valve device may comprise a casing 1 having a piston chamber 2 connected to a speed control pipe 57, through which the fluid pressure in piston chamber 2 is varied according to the operation of the speed control apparatus. A piston 3 contained in piston chamber 2 is adapted to operate a slide valve 4, contained in valve chamber 5 which communicates through passage 6 with a source of fluid under pressure, such as the main reservoir 7.

Associated with the application valve device is an equalizing discharge valve mechanism comprising a casing 8 containing a piston 9 having the chamber 10 at one side connected by a passage 11 with an equalizing reservoir 12 and the chamber 13 at the opposite side with the usual train brake pipe 14. Said piston is adapted to operate a discharge valve 15 for venting fluid from the brake pipe 14 to effect a reduction in brake pipe pressure and thus cause an application of the brakes in the well known manner.

The mechanism for automatically effecting the split or two application feature of my invention may comprise a casing 16 containing a pilot valve mechanism and a hold back valve mechanism. The pilot valve mechanism may comprise a hollow piston 17 having the piston chamber 18 at the closed end of the piston connected to a passage 19 which leads to the seat of application slide valve 4 and which is also connected to a timing reservoir 20.

In the open end of the piston 17 is mounted a collapsible piston 21 having a longitudinal slot for receiving a pin 22 which is secured to piston 17. Interposed between the closed end of piston 17 and the collapsible piston 21 is a coil spring 23. The piston 21 carries a valve 24 for controlling communication from a chamber 25 to an atmospheric vent port 26, which port also communicates with an intermediate chamber 27.

The hold back valve mechanism may comprise a hollow piston 28 having a seat 29 at one end for engaging a seat ring 30. The inner seated area of the seat 29 is connected by a passage 31 with a second reduction reservoir 32 and the outer seated area is connected by a passage 33 with a first reduction reservoir 34. A spring 35 tends to maintain the piston 28 seated at the right and movement of said piston to the left is adapted to operate a valve 36 through engagement with a stem 37. The left hand end of piston 28 is flared to form a seating ring 39 which is adapted to engage a seat upon movement of piston 28 to the left.

In operation, the valve chamber 5 of the application valve device is charged with fluid under pressure from the reservoir 7 by way of passage 6 and fluid from valve chamber 5 equalizes into the piston chamber 2 through a restricted port 40 in piston 3, thus permitting the spring 41 to hold the piston 3 in its normal release position, so long as the control pipe 57 remains closed. Fluid from the brake pipe 14 flows to the chamber 13 of the equalizing discharge piston 9 and through a passage 42, past a check valve 43, a cavity 44 in slide valve 4, and a passage 45 to the piston chamber 10. From passage 45 fluid also flows through passage 11 to the equalizing reservoir 12, charging same to the pressure carried in the brake pipe 14.

The first reduction reservoir 34 is vented to the atmosphere through passage 46 and cavity 47 in slide valve 4 to exhaust port 58. The second reduction reservoir 32 is also vented to the atmosphere by way of passage 31 and past the check valve 51 to the passage 46, through which fluid is vented from the first reduction reservoir, as previously described.

The passage 19 being connected through cavity 47 in slide valve 4 with exhaust port 58, the piston chamber 18 of piston 17 and the timing reservoir 20 will be at atmospheric pressure, so that the light coil spring 52, acting on the opposite side of piston 17 will hold said piston to its extreme position at the right, as shown in Fig. 1, with the valve 24 held unseated by the operation of the collapsible piston 21. The valve chamber 38 containing the valve 39 being connected to the atmosphere through passage 59, chamber 25, and past the open valve 24 to exhaust port 26 and the opposite side of piston 28 being also at atmospheric pressure, the spring 35 will maintain said piston in its seated position at the right, as shown in Fig. 1.

When fluid under pressure is vented from piston chamber 2 of the application valve device through pipe 57, by the operation of the speed control apparatus, the piston 3 will be shifted to application position, as shown in Fig. 2.

In this position, fluid is vented from the equalizing reservoir 12 and the piston chamber 10 of the equalizing discharge valve piston 9 to the first reduction reservoir 34, through passages 11 and 45, port 53 in slide valve 4, said port having a restricted portion 54, and passage 46, to the first reduction reservoir 34. The pressure in the equalizing reservoir 12 expanding into the first reduction reservoir 34, reduces the equalizing reservoir pressure by a predetermined amount. For example, the volume of the first reduction reservoir 34 may be such that equalization will cause a reduction of eight pounds in the equalizing reservoir pressure.

The equalizing piston 9 is then shifted by the higher brake pipe pressure acting in chamber 13, so as to unseat the discharge valve 15 and permit the venting of fluid from the brake pipe 14 so as to effect an application of the brakes. When the brake pipe pressure has been reduced to a degree slightly less than the reduction in equalizing reservoir pressure, the piston 9 will be operated to move the valve 15 to its seat, thus preventing the further discharge of fluid from the brake pipe.

Fluid thus vented from the brake pipe is not vented directly to the atmosphere as usual, but is vented to the timing reservoir 20 and the piston chamber 18 of the pilot valve mechanism by way of passage 55, a port 56 in slide valve 4, leading to cavity 47 and thence through passage 19 to the timing reservoir 20.

As fluid discharged from the brake pipe 14 flows into the piston chamber 18 at a greater rate than it can escape through the restricted ports 48 and 49, the pressure will build up in piston chamber 18 so as to move the piston 17 to the left, compressing the light spring 52, and causing the valve 24 to seat, as shown in Fig. 2. In this position, further movement of piston 17 to the left is opposed by the heavier coil spring 23, but the further rapid building up of pressure in piston chamber 18 and in the timing reservoir 20 by flow from the brake pipe causes a further movement of piston 17 to the left.

Upon said further movement to the left, the piston 17 moves relatively to the piston 21 owing to the collapsible character of piston 21, so that communication is established from piston chamber 18, past a reduced section of piston 17 to chamber 27, as shown in Fig. 3. The chamber 27 being open to exhaust port 26, a rapid venting of fluid from the timing reservoir 20 and the piston chamber 18 takes place so long as the discharge valve 15 remains open. When the discharge valve 15 closes after the predetermined reduction in brake pipe pressure has been completed, the pressure in piston chamber 18 and in timing reservoir 20 falls rapidly, permitting the reservoir spring 23 to move the piston 17 to the position shown in Fig. 2 in which the exhaust port piston 17 to chamber 27 is cut off.

The further reduction in pressure in piston chamber 18 and in timing reservoir 20 takes place at a slower rate by escape through the restricted ports 48 and 49 to the exhaust port 26 and when the pressure has been reduced to a degree slightly less than the value of the light spring 52, the piston 17 will be shifted to the right, so as to cause the collapsible piston 21 to unseat the valve 24, as shown in Fig. 1.

Figure 4:
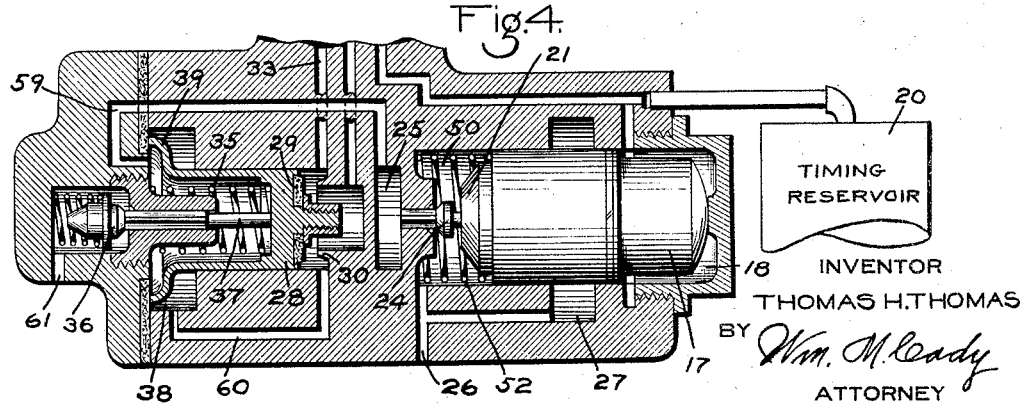

During the above operation, the fluid pressure equalized into the first reduction reservoir 34 is supplied through passage 33 to the outer seated area of piston 28 and from said area through passage 60 to valve chamber 38 and consequently when the valve 24 is opened by the operation of the piston 17, fluid is vented from valve chamber 38 through passage 59 to chamber 25 and thence past the open valve 24 to exhaust port 26. The fluid pressure acting on the outer seated area of piston 28 then operates to shift said piston to the left, as shown in Fig. 4, so that passage 33 is connected to passage 31. Fluid under pressure in the equalizing reservoir 12 and in the first reduction reservoir 34 will then equalize into the second reduction reservoir 32 and thus a second reduction in pressure in chamber 10 of the equalizing discharge valve mechanism is effected and thereby the valve 15 is operated to effect a second predetermined reduction in brake pipe pressure, corresponding with the combined volumes of the first and second reduction reservoirs.

In the open position of piston 28, the seat ring 39 seats, so as to cut off communication from valve chamber 38 to passage 59 and exhaust port 26, thus preventing a reduction of pressure in the reduction reservoirs by flow through the passage 60.

In this movement, the piston 28 engages the stem 37 of valve 36 and operates to lift said valve from its seat, so that although the piston 17 is operated to close the valve 24 during the second reduction in brake pipe pressure, the area of piston 28 which is seated by the seat ring 39 will be maintained at atmospheric pressure by the venting of fluid from said seated area past the valve 36 to the atmospheric exhaust port 61, to provide against possible leakage of fluid under pressure from chamber 38 around the seat ring 39 to the inner seated area of the piston 28.

When the application piston 3 moves back to release position in releasing the brakes, the reduction reservoirs 32 and 34 are connected through cavity 47 in slide valve 4 with exhaust port 58, so that fluid under pressure in said reservoir is vented to the atmosphere, and opposite sides of the hold back piston 28 being at atmospheric pressure, the spring 35 returns said piston to its normal position, as shown in Fig. 1.

In the operation of the above described apparatus, the volume of the timing reservoir 20 determines the time elapsing between the first reduction in brake pipe pressure and the second reduction and in some instances it will not be necessary to provide a timing reservoir, in which case, the apparatus operates to effect the second reduction in brake pipe pressure substantially upon completion of the venting of fluid from the brake pipe in effecting the first reduction in brake pipe pressure.

While the apparatus has been described as operating in connection with an automatic train speed control equipment, it will be evident that the apparatus may be employed in connection with the usual brake pipe equipment, in which case the usual engineer's brake valve is provided with ports and cavities corresponding with those in the slide valve 4, so that when the brake valve device is turned by the engineer to brake application position, the apparatus will operate the same as when the slide valve 4 is moved by piston 3 to brake application position.

Having now described my invention, what I claim as new and desire to secure by Letters Patent, is:—

1. In a fluid pressure brake, the combination with a brake pipe, of means for effecting a predetermined reduction in brake pipe pressure and means operated automatically upon completion of said predetermined reduction in brake pipe pressure for effecting a second reduction in brake pipe pressure.

2. In a fluid pressure brake, the combination with a brake pipe, of means for automatically effecting a predetermined reduction in brake pipe pressure and then a second reduction in brake pipe pressure upon the completion of the first reduction in brake pipe pressure.

3. In a fluid pressure brake, the combination with a brake pipe, of means for effecting a predetermined reduction in brake pipe pressure and means controlled by fluid vented from the brake pipe for effecting a second reduction in brake pipe pressure.

4. In a fluid pressure brake, the combination with a brake pipe, of means for effecting a predetermined reduction in brake pipe pressure, additional means for effecting a second reduction in brake pipe pressure, and means controlled by fluid vented from the brake pipe in making said predetermined reduction in brake pipe pressure for holding back the operation of said additional means.

5. In a fluid pressure brake, the combination with a brake pipe, of means for effecting a predetermined reduction in brake pipe pressure, additional means for effecting a second reduction in brake pipe pressure, and means operated by fluid vented from the brake pipe in making said predetermined reduction in brake pipe pressure for preventing the operation of said additional means.

6. In a fluid pressure brake, the combination with a brake pipe, of means for effecting a predetermined reduction in brake pipe pressure, additional means for effecting a further reduction in brake pipe pressure, and means for delaying the operation of said additional means.

7. In a fluid pressure brake, the combination with a brake pipe, of means for effecting a predetermined reduction in brake pipe pressure, additional means for effecting a further reduction in brake pipe pressure, and means for delaying the operation of said additional means while the predetermined reduction in brake pipe pressure is being effected.

8. In a fluid pressure brake, the combination with a brake pipe, of a valve mechanism for venting fluid from the brake pipe, means for effecting the operation of said valve mechanism to produce a predetermined reduction in brake pipe pressure, and means subject to the pressure of fluid vented from the brake pipe for controlling the operation of said valve mechanism to effect a second reduction in brake pipe pressure.

9. In a fluid pressure brake, the combination with a brake pipe, of an equalizing reservoir, a valve mechanism subject to the opposing pressures of the equalizing reservoir and the brake pipe for venting fluid from the brake pipe, a first and a second reduction reservoir, and means for first connecting the first reduction reservoir to said equalizing reservoir and then the second reduction reservoir.

10. In a fluid pressure brake, the combination with a brake pipe, of an equalizing reservoir normally charged with fluid under pressure, a valve mechanism subject to the opposing pressures of said reservoir and the brake pipe for controlling the venting of fluid from the brake pipe, a first reduction reservoir, a second reduction reservoir, both normally at atmospheric pressure, and means for first connecting the first reduction reservoir to said equalizing reservoir and then the second reduction reservoir.

11. In a fluid pressure brake, the combination with a brake pipe, of a valve mechanism for venting fluid from the brake pipe to effect a reduction in brake pipe pressure, valve means for effecting the operation of said valve mechanism, a valve device subject to the pressure of fluid vented from the brake pipe by operation of said valve mechanism for controlling the operation of said valve means, and a restricted communication through which fluid vented from the brake pipe to said valve device is vented to the atmosphere.

12. In a fluid pressure brake, the combination with a brake pipe, of a valve mechanism for venting fluid from the brake pipe, means for effecting the operation of said valve mechanism to produce a predetermined reduction in brake pipe pressure, valve means for effecting the operation of said valve mechanism to produce a second reduction in brake pipe pressure, and a valve device subject to the pressure of fluid vented from the brake pipe in effecting said predetermined reduction in brake pipe pressure and operative upon a predetermined reduction in fluid pressure by escape through a restricted port for effecting the operation of said valve means.

13. In a fluid pressure brake, the combination with a brake pipe, of a valve mechanism for venting fluid from the brake pipe to effect a reduction in brake pipe pressure, valve means for effecting the operation of said valve mechanism, and a valve device for effecting the operation of said valve means and operated by the flow of fluid vented from the brake pipe by operation of said valve mechanism for preventing the operation of said valve means.

14. In a fluid pressure brake, the combination with a brake pipe, of an equalizing reservoir, a valve mechanism subject to the opposing pressures of the brake pipe and the equalizing reservoir for controlling the venting of fluid from the brake pipe, a reduction reservoir, an application valve device operative to connect said reduction reservoir with the equalizing reservoir, a second reduction reservoir, valve means operative to connect said second reduction reservoir with the equalizing reservoir, and means for delaying the operation of said valve means.

15. In a fluid pressure brake, the combination with a brake pipe, of an equalizing reservoir, a valve mechanism subject to the opposing pressures of the brake pipe and the equalizing reservoir for controlling the venting of fluid from the brake pipe, a reduction reservoir, a train speed controlled application valve device operative to connect said reduction reservoir with the equalizing reservoir, a second reduction reservoir, valve means operative to connect said second reduction reservoir with the equalizing reservoir, and means for delaying the operation of said valve means.

16. In a fluid pressure brake, the combination with a brake pipe, of a valve mechanism for venting fluid from the brake pipe to effect a reduction in brake pipe pressure, valve means operative to effect the operation of said valve mechanism, a timing reservoir, a valve device subject to the pressure of fluid vented from the brake pipe to said timing reservoir by operation of said valve mechanism for controlling the operation of said valve means.

17. In a fluid pressure brake, the combination with a brake pipe, of a valve mechanism for venting fluid from the brake pipe to effect a reduction in brake pipe pressure, valve means operative to effect the operation of said valve mechanism, a valve device subject to the pressure of fluid vented from the brake pipe by operation of said valve mechanism for controlling the operation of said valve means, and an application valve device for controlling communication through which fluid vented from the brake pipe is supplied to said valve device.

18. In a fluid pressure brake, the combination with a brake pipe, of a valve mechanism for venting fluid from the brake pipe to effect a reduction in brake pipe pressure and a valve device for controlling communication through which fluid is vented from the brake pipe by operation of said valve mechanism and operable upon the cessation of venting of fluid from the brake pipe for effecting a second operation of said valve mechanism to produce a second reduction in brake pipe pressure..

In testimony whereof I have hereunto set my hand.

THOMAS H. THOMAS.